United States Patent [19]

Stegall, Sr. et al.

[11] Patent Number: 5,720,875
[45] Date of Patent: *Feb. 24, 1998

[54] WASTE TREATMENT SYSTEM HAVING MEANS FOR CONTROLLING FILTERED BACKWASH

[75] Inventors: William A. Stegall, Sr., Denham Springs; Marty Tittlebaum, Baton Rouge, both of La.

[73] Assignee: William A. Stegall, Denham Springs, La.; by said Marty Tittlebaum

[*] Notice: The term of this patent shall not extend beyond the expiration date of Pat. No. 5,269,911.

[21] Appl. No.: 514,601

[22] Filed: Aug. 14, 1995

Related U.S. Application Data

[63] Continuation-in-part of Ser. No. 167,529, Dec. 14, 1993, Pat. No. 5,441,631, which is a continuation-in-part of Ser. No. 874,057, Apr. 24, 1992, Pat. No. 5,269,911.

[51] Int. Cl.[6] .................................................. B01D 24/46
[52] U.S. Cl. ...................... 210/108; 210/257.1; 210/258; 210/411; 210/532.2
[58] Field of Search .............................. 210/86, 97, 104, 210/108, 109, 194, 195.1, 202, 205, 258, 259, 411, 416.1, 521, 532.1, 532.2, 136, 179, 791

[56] References Cited

U.S. PATENT DOCUMENTS

| | | | |
|---|---|---|---|
| 4,021,347 | 5/1977 | Teller et al. | 210/411 |
| 4,211,654 | 7/1980 | Weber et al. | 210/104 |
| 4,211,655 | 7/1980 | Jordan | 210/108 |
| 4,505,813 | 3/1985 | Graves | 210/411 |
| 4,664,795 | 5/1987 | Stegall et al. | 210/202 |
| 4,681,684 | 7/1987 | Maroschak et al. | 210/532.2 |
| 4,834,879 | 5/1989 | Stegall et al. | 210/205 |
| 4,986,905 | 1/1991 | White | 210/108 |
| 5,106,493 | 4/1992 | McIntosh | 210/108 |
| 5,200,065 | 4/1993 | Sinclair et al. | 210/108 |
| 5,269,911 | 12/1993 | Stegall et al. | 210/108 |
| 5,441,631 | 8/1995 | Stegall et al. | 210/258 |

*Primary Examiner*—Joseph W. Drodge
*Attorney, Agent, or Firm*—Pravel, Hewitt, Kimball & Krieger

[57] ABSTRACT

A wastewater treatment system uses a primary treatment vessel and a secondary vessel with a filtration unit therebetween. Continuous backwashing of the filtration unit occurs when a well pump is activated to empty the secondary vessel. A portion of fluid discharged by the well pump backwashes the filter continuously as the secondary treatment vessel is emptied.

9 Claims, 9 Drawing Sheets

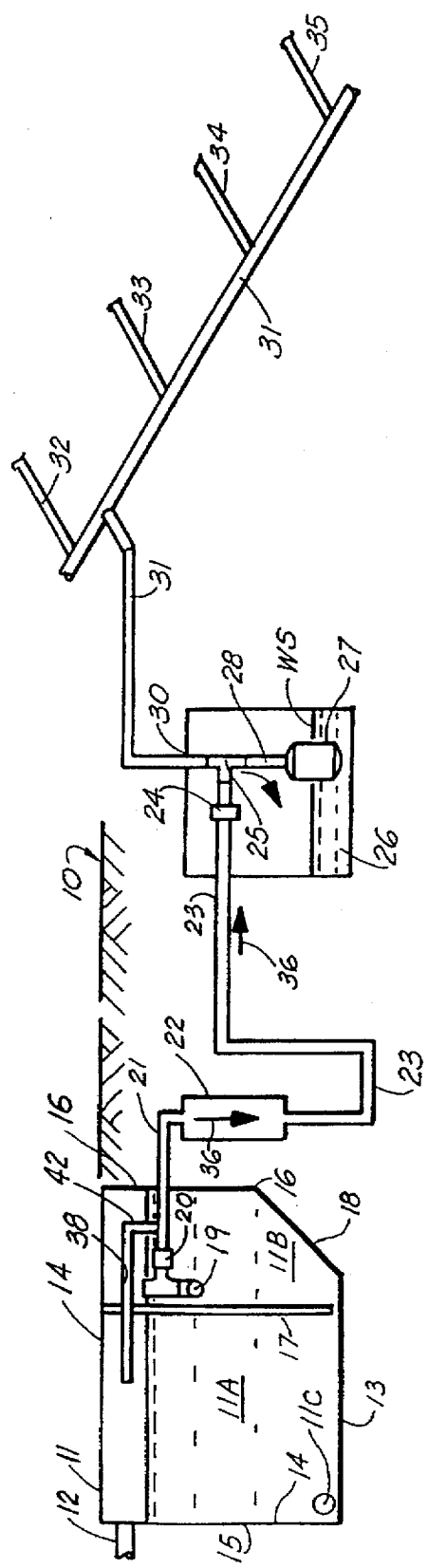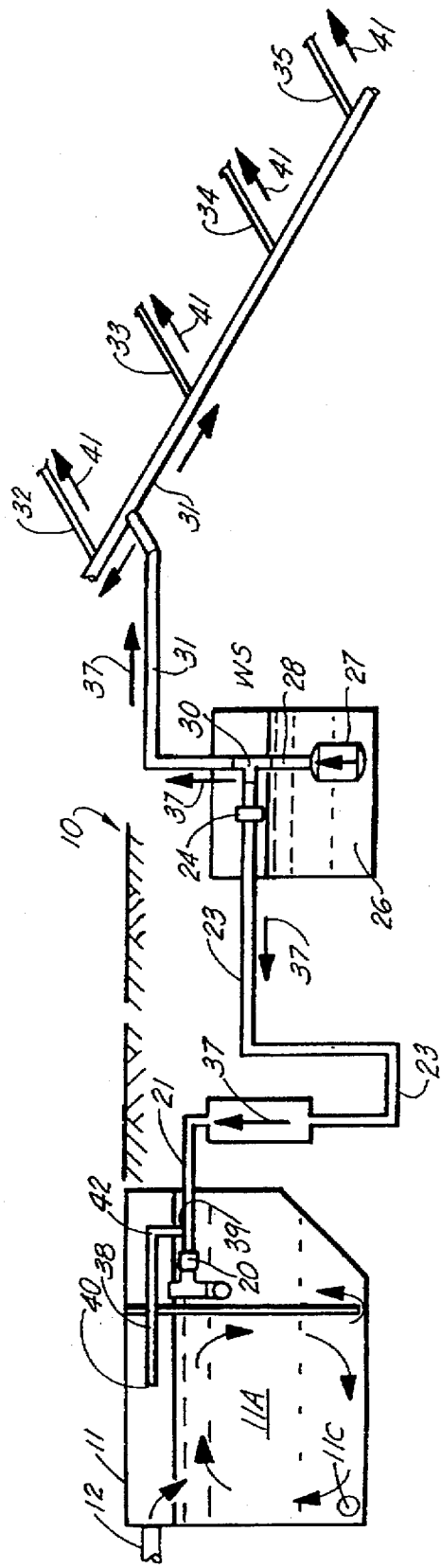

WASTE TREATMENT SYSTEM HAVING MEANS FOR CONTROLLING FILTERED BACKWASH

SPECIFICATION

This is a continuation-in-part application of prior, application, U.S. patent application Ser. No. 08/167,529, filed Dec. 14, 1993, now U.S. Pat. No. 5,441,631, which is a continuation-in-part of U.S. patent application Ser. No. 07/874,057, filed Apr. 24, 1992, now U.S. Pat. No. 5,269,911 and incorporated herein by reference.

BACKGROUND OF THE INVENTION

1. Field of the Invention

The present invention relates to self-contained waste treatment systems and more particularly relates to an improved self-contained wastewater treatment for use in rural areas and in the treatment of wastewater from small buildings, homes, trailer parks, office buildings and the like wherein a primary treatment vessel treats the wastewater product and the effluent passes through a filtration unit into a dosing vessel that cycles between empty and full conditions, with a pump in the dosing tank being activated when the dosing vessel reaches full position, and wherein a flow control device divides discharging flow from the pump into a first larger volume that is discharged to the environment, and a smaller flow portion that backwashes the filter, returning dirty backwash to the primary vessel.

2. General Background

It is desirable that wastewater be treated in an economical way utilizing as little energy as possible and as few moving parts as possible while removing a high percentage of solid material from the wastewater stream and while lowering the total suspended solids and biochemical oxygen demand of the wastewater stream. It is desirable that a minimum of sludge removal would be required since sludge disposal presents an extra problem.

It would be desirable that a wastewater treatment apparatus produce a total homogenation of the fluids received from the waste stream and microorganisms present in the treatment system in order that they be properly biodegraded.

In aerated treatment systems, a problem is faced in that a clogging of the aeration assembly which provides oxygen and mixing to the unit will cause a degeneration of the treatment process or in fact a total stoppage of air flow to the vessel, transferring the process from aerobic to anaerobic, thus reducing most treatment capability. It would be desirable that the aeration unit or air diffuser be provided that minimizes or prevents clogging by solid material which may enter the unit.

In a small wastewater treatment system for use in treatment of wastewater from single family dwellings, small businesses, apartments and the like, tertiary treatment is desirable so that underground disposal of effluent can be used such as under crops to eliminate or minimize environmentally adverse effects.

Also, particularly desirable is a system that would allow treated wastewater to be filtered, prior to environmental discharge, to remove any untreated solids. Inherent in filtration treatment is the problem of filter clogging and the possibility of excessive filter maintenance. Hence, particularly desirable is a system in which the filter may be automatically and routinely backwashed to eliminate problems of filter clogging and excessive maintenance.

SUMMARY OF THE PRESENT INVENTION

The present invention provides an individual home type sewerage treatment system that affords an economical alternative for use in treating domestic wastewater on a day-to-day basis. The apparatus includes a primary treatment vessel wherein waste is biodegraded. The primary treatment vessel may include a non-aerated chamber or in the alternate, an extended aeration chamber with an activated sludge system which is capable of producing a clear, odorless effluent which meets applicable state and federal discharge standards (USEPA). An effluent filtration unit and subsurface disposal system are included in the treatment system to treat the effluent from the primary treatment chamber.

Of particular utility is an automatically self-backwashing filtration unit. The self-backwashing filtration unit both automatically filters the treated wastewater prior to environmental discharge, and automatically backwashes the filter preventing filter clogging and extensive maintenance. Both the treatment system and the filtration unit are ideally suited for upgrading existing septic tank systems, in which case the septic tank continues to function as an anaerobic solids tank from which the effluent is discharged into the either primary treatment vessel or the filtration unit. The subsurface disposal system is capable of disposing of the high-quality, treated effluent into almost any soil condition or site topography.

The automatic backwash filtering system of the present invention is designed to provide tertiary treatment for treated wastewater prior to environmental discharge. In the filtration system, effluent from the treatment vessel gravity flows through a flap check valve to the top of a sand filter. The treated wastewater then passes through the filtering media and a support plate by gravity flow. The filtered effluent flows through a second flap check valve and into a dosing chamber. The dosing chamber contains a well-type pump that can be activated by an electric, mercury control float switch. When the float switch activates the pump, a predetermined amount of filtered effluent is pumped from the dosing chamber. When the pressurized effluent leaves the dosing chamber it travels in two directions. The majority of the flow (for example 75%) is delivered to subsurface dripper lines for disposal. The remainder of the flow (for example 25%) is utilized to automatically backwash the sand filter.

The proportion of the flow used for backwashing is directed into a backwash line and through a manually controllable flow valve which is used to limit the amount of treated water being used for backwashing. This valve is desirably adjustable so that a preselected flow value can be used for backwashing the filter. The pressurized backwash water then flows upwardly through the media support plate and filtering media slightly expanding the sand bed and effectively cleaning any captured solids from the filter.

The backwash water and debris then exit the top of the filter and into a backwash line. The dirty water is then returned to the treatment vessel, to be retreated. When the dosing well pump shuts off, backwashing stops and gravity flow through the filter resumes automatically.

The present invention provides an improved wastewater treatment system that includes a first treatment vessel having an interior area for containing a wastewater to be treated. The interior is either a single, non-aerated chamber, or in the alternate, is divided into upstream and downstream portions with a transverse baffle plate. The vessel includes an influent line for adding a wastewater stream to be treated to the interior area. The interior is/or is not aerated and an effluent line discharges clarified liquid from the vessel interior.

A filter (preferably a sand filter) is disposed downstream of the first treatment vessel for filtering clarified liquid that is discharged from the first treatment vessel.

A dosing vessel with an interior area contains liquid that has been filtered with the sand filter, the second vessel being positioned downstream of the filter and including a pump for emptying the second vessel when it is filled with filtered liquid.

A discharge flowline receives effluent from the second vessel and a drip header system can receive flow therefrom, comprising a network of flowlines for distributing the filtered liquid over an expansive area such as a parcel of land.

A flow control device enables a partial volume of liquid exiting the dosing vessel to be transmitted to the filter in reverse flow direction for backwashing the filter. A backwash flowline positioned between the first treatment vessel and the filter recirculates dirty backwash from the filter to the first vessel.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a sectional, elevation, and schematic view of the preferred embodiment of the apparatus of the present invention illustrating in the aerated treatment vessel in the normal operating position prior to backwashing;

FIG. 2 is a sectional, elevation, and schematic view of the preferred embodiment of the apparatus of the present invention illustrating the aerated treatment vessel with a backwashing flow and treated effluent discharge configuration;

DETAILED DESCRIPTION OF THE PREFERRED EMBODIMENT

Figure 4:
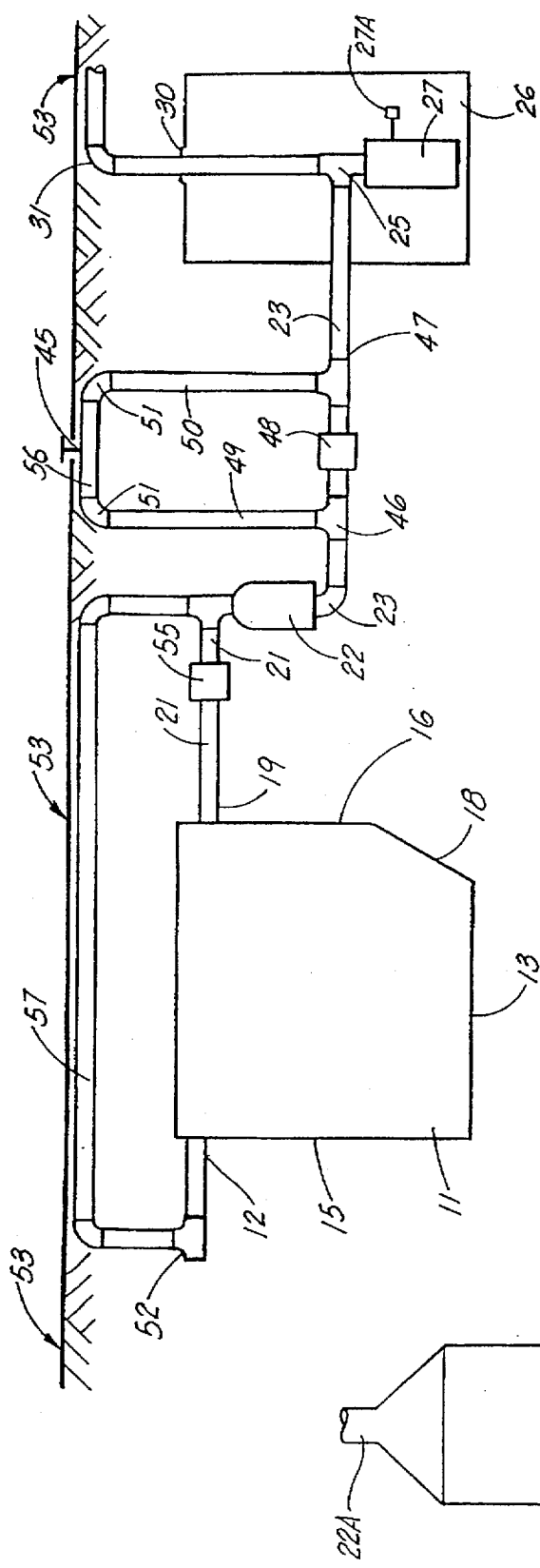
FIG. 4 is a sectional, elevation, and schematic view of the preferred embodiment of the apparatus of the present invention illustrating the aerated treatment vessel with an alternate backwash flow volume control valve arrangement.

FIG. 1 illustrates the preferred embodiment of the apparatus of the present invention shown with aerated treatment vessel 11 in a normal flow situation. FIG. 1 further illustrates the preferred embodiment of the present invention where aerating treatment vessel 11 has an influent flowline 12 for receiving waste flow into the aerating treatment vessel 11.

Aerating treatment vessel 11 includes a bottom wall 13, top wall 14, front wall 15 and rear wall 16. A top can seal the vessel 11 so that vessel 11 can be installed underground.

Vertical baffle 17 divides the aerating treatment vessel 11 into first and second interior portions 11A, 11B. Inclined wall 18 extends between rear wall 16 and bottom wall 13 as shown in FIG. 1. An aerator 11C aerates fluid contained in the portion 11A of the aerating treatment vessel 11.

An effluent header 19 includes multiple turns for existing flow and before the exiting flow enters effluent line 21, passing through first check valve 20. It should be understood that the aerating treatment vessel 11, effluent header 19, and baffle 17 are all shown in prior U.S. Pat. Nos. 4,664,795 issued May 12, 1987 and 4,834,879 issued May 30, 1989, each of which is incorporated herein by reference.

Figure 3:
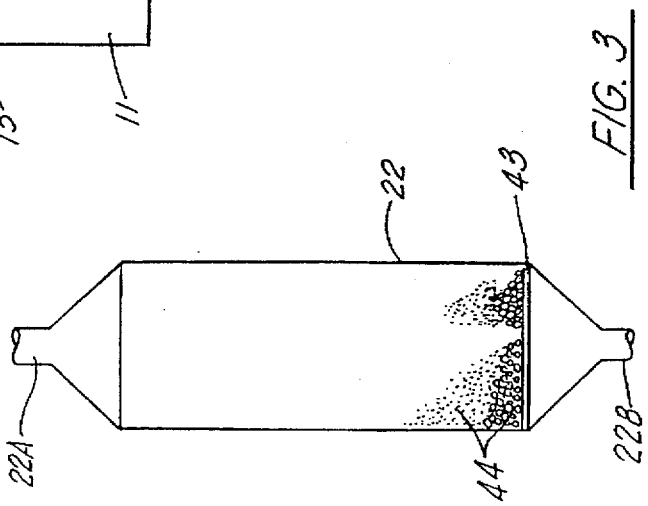
FIG. 3 is a sectional, elevational and fragmentary view of the sand filter portion of the preferred embodiment of the apparatus of the present invention.

Effluent line 21 transmits treated fluid leaving the aerating treatment vessel 11 to filter 22 via filter inlet 22A. The filter 22 further cleanses flow that has been treated by the aerating treatment vessel 11, removing small particulate matter from the wastewater stream being treated. Filter 22 is preferably a media type filter such as a sand filter. The sand filter (FIG. 3) has a transversely positioned media support plate 43 positioned at the lower end portion of filter 22, just above outlet 22B. On the top of the support plate is a coarse media such as gravel, two to three inches thick. On top of the gravel is a coarse grain sand such as size 610. This designation indicates that 90% of the sand falls between U.S. standard sieve size 6 and 10 (3.35 millimeters and 2.0 millimeters). The plate 43 is perforated using for example a plurality of one eighth inch diameter holes drilled therethrough for the passage of liquid from the filter 22 via outlet 22B and into flowline 23.

After traveling through filter 22 in the direction shown by arrow 36, flow enters effluent line 23 for filtered effluent. The filtered effluent line 23 empties via flow control device 24 and tee fitting 25 into dosing chamber 26. The dosing chamber 26 is provided with a well pump 27 that is activated with a commercially available float control device such as electric, mercury controlled float switch 27A (FIGS. 4 and 6) for activating pump 27 when the fluid level reaches maximum water surface WS in dosing chamber 26. Flow control device 24 can be a check valve with a small metered orifice in the center of the check valve wafer. In this manner, the wafer opens when normal flow is in the direction of arrow 36, from vessel 11 to filter 22, through flow control device valve 24 to sump 26.

Pump discharge line 28 communicates with tee fitting 25 and empties the contents of the dosing chamber 26 after the pump 27 has been activated as occurs when the water surface WS reaches its maximum level and sump 26 is full. When the pump 27 is activated, flow proceeds in the direction illustrated by arrows 37 in FIG. 2.

Discharging flow exits outlet 30 proceeds through discharge header 31 containing the majority of flow volume discharged by pump 27. However, a smaller amount of flow discharged by pump 27 enters line 23 as defined by flow control device 24. The flow control device 24 provides a selected orifice opening that defines how much flow passes the flow control device 24 in a backwash situation. By selectively sizing the flow control orifice fitting of flow control device 24, an exact selected amount of backwashing fluid flow can be transmitted by the pump 27 through the tee fitting 25 and into the line 23 as shown by the arrows 37. Thus, a continuous desired flow of backwashing fluid can be transmitted through the line 23 for backwashing the sand filter 27 in the direction of 37.

Dirty backwash flows into the effluent line 21 during the entire time period that the pump 27 is emptying the dosing chamber 26 via the tee fitting 25 and the flowlines 31 and 23.

In FIGS. 1 and 2, first check valve 20 is positioned between effluent line 21 and effluent header 19. The first check valve 20 allows flow in the direction of arrows 36 in FIG. 1, but disallows flow in the direction of arrows 37 in FIG. 2. Flow backwashing sand filter 22 bypasses first check valve 20 and reenters the upstream interior portion 11A of the aerating vessel 11 via bypass line 38, tee fitting 39, and elbow 42 until it discharges at discharge opening 40.

In the discharge and backwashing configuration of FIG. 2, arrows 41 indicate the direction of drip effluent. A plurality of drip lines 32–35 can be provided, each extending from the header 31. The drip lines 32–35 can be a sprinkler system for irrigation of a lawn, or garden or crops for example.

In FIG. 4, the apparatus of the present invention with aerating treatment vessel 11 is shown with optional adjustable flow control arrangement 56. In FIG. 4, the flow during backwashing proceeds from dosing chamber 26 via flowline 23 in the direction of arrow 37 (FIG. 2). A pair of tee fittings 46, 47 are placed in line 23 as shown in FIG. 4. Second check valve 48 is positioned between tee fittings 46, 47. Each of the tee fittings 46, 47 communicates with a riser section 49, 50 respectively.

Horizontal flowline portion 51 extends between risers 49, 50 and contains control valve 45. In FIG. 4, the adjustable control valve 45 can be opened or closed at ground level 53. Adjustable control valve 45 provides a flow opening that defines the amount of backwash fluid flowing through line 23 in order to backwash the filter 22. In a backwash situation, the backwashing fluid from pump 27 and tee 25 closes second check valve 48. Backwashing fluid first enters tee fitting 47, then riser 50, and then horizontal section 51 with control valve 45. After exiting adjustable control valve 45, backwashing fluid enters riser 49 and then tee fitting 46 before reentering line 23 upstream of second check valve 48. This backwashing fluid then enters the outlet 22B fitting of filter 22 for backwashing as described with respect to the preferred embodiment.

Third check valve 55 prevents backwashing fluid from entering the discharge side of aerating treatment vessel 11. The backwashing fluid travels via bypass line 38 to upstream fitting 52 and is reintroduced via influent flowline 12 to aerating treatment vessel 11. The use of a pair of risers 49, 50 in combination with the second check valve 48 and adjustable control valve 45 allows the backwash flow level to be adjusted as needed at ground level 53. This is important because it allows a very high volume of backwashing fluid to be used from time to time in order to remove any clogging that might have accumulated in the filter. However, the flow value for backwashing fluid passing through adjustable control valve 45 is typically set, as described above at twenty-five percent (25%) of total flow, and where, for example, total flow discharge via header 31 to dripper lines 32–35 would thus be seventy-five percent (75%) of total flow.

Figure 5:
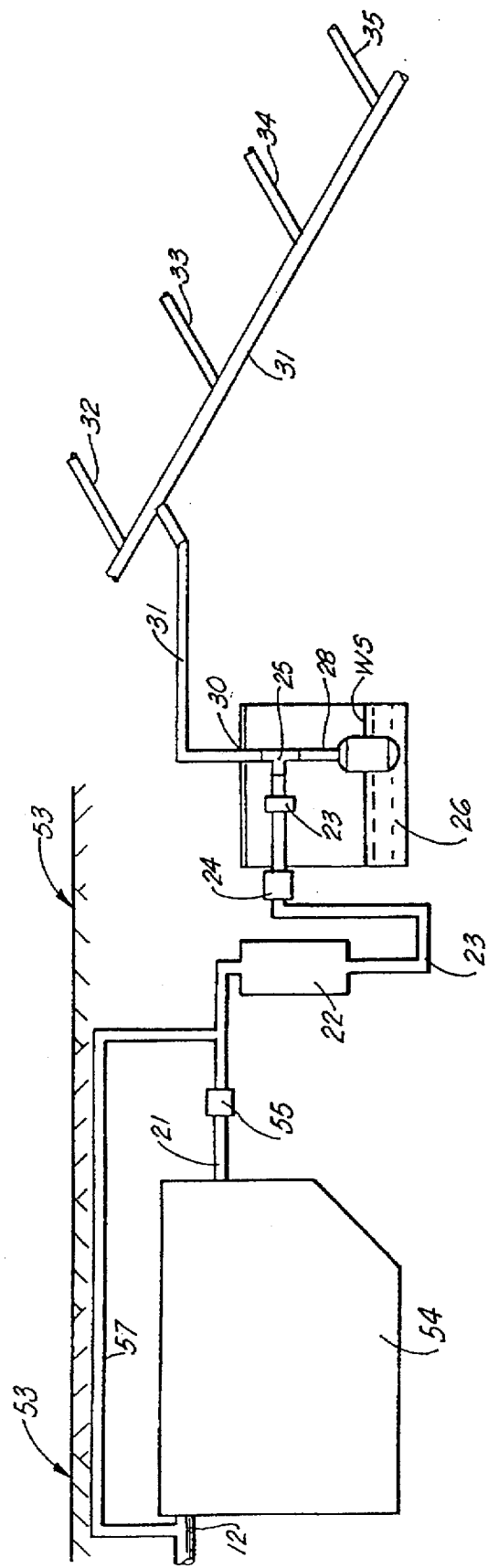
FIG. 5 is a sectional, elevation, and schematic view of the preferred embodiment of the apparatus of the present invention illustrating an alternate non-aerating chamber.

FIG. 5 shows the preferred embodiment illustrated in FIGS. 1 and 2 except that FIG. 5 shows the present invention with an alternate non-aerating treatment vessel 54 in place of the aerating treatment vessel 11, and FIG. 5 shows alternate bypass line 57 in place of bypass line 38 as shown in FIG. 1. Bypass line 38 or 57 may discharge backwash water anywhere upstream of the first check valve. All other features of the preferred embodiment as illustrated in FIG. 5 down stream of effluent line 21 are the same of those described for FIGS. 1 and 2.

Figure 6:
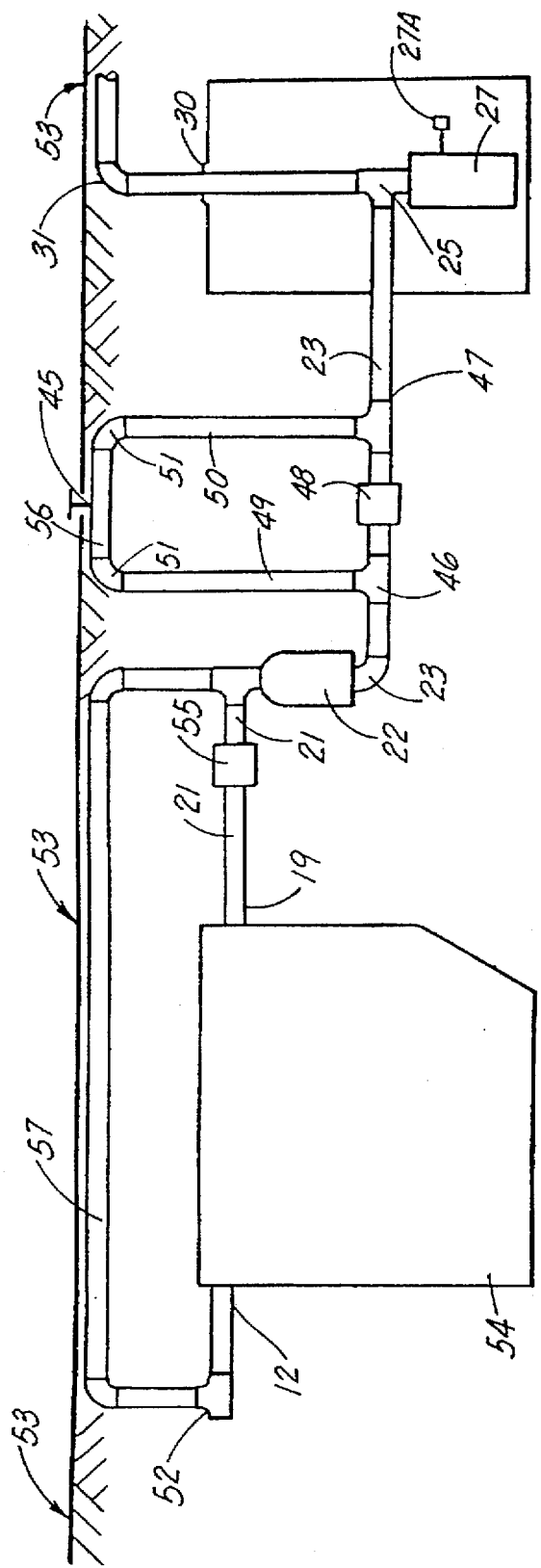
FIG. 6 is a sectional, elevation, and schematic view of the preferred embodiment of the apparatus of the present invention illustrating an alternate non-aerating treatment vessel with an alternate backwash flow volume control valve arrangement.
Figure 7A:
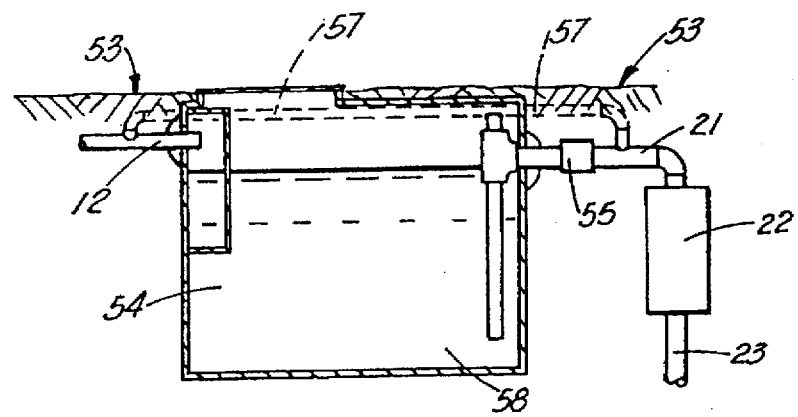
FIGS. 7A–7E are sectional, elevation, schematic, and fragmentary views of alternate non-aerating treatment vessels.
Figure 7B:
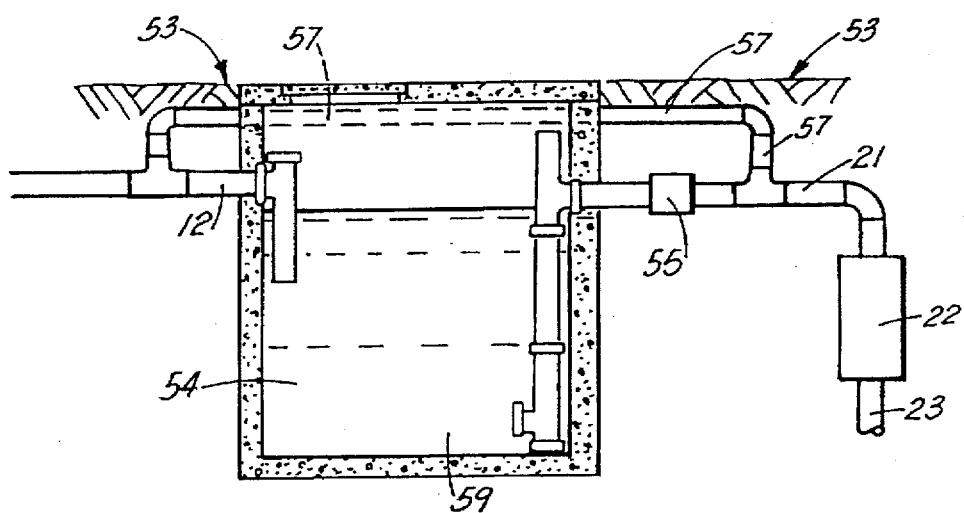
Figure 7C:
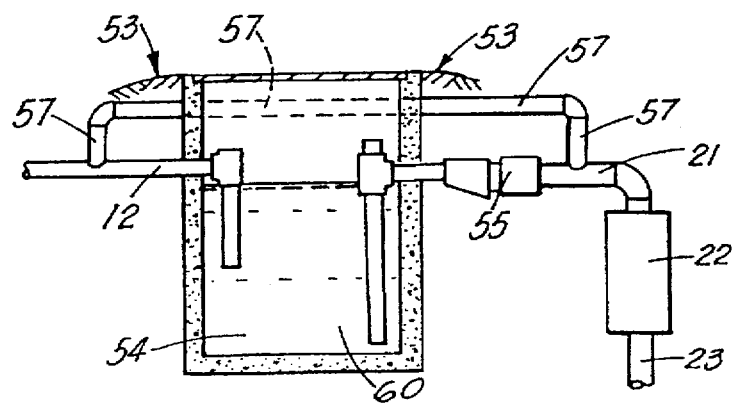
Figure 7D:
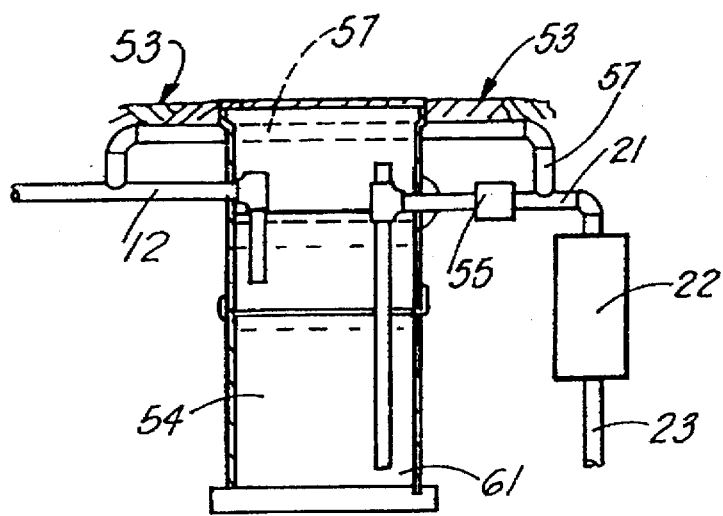
Figure 7E:
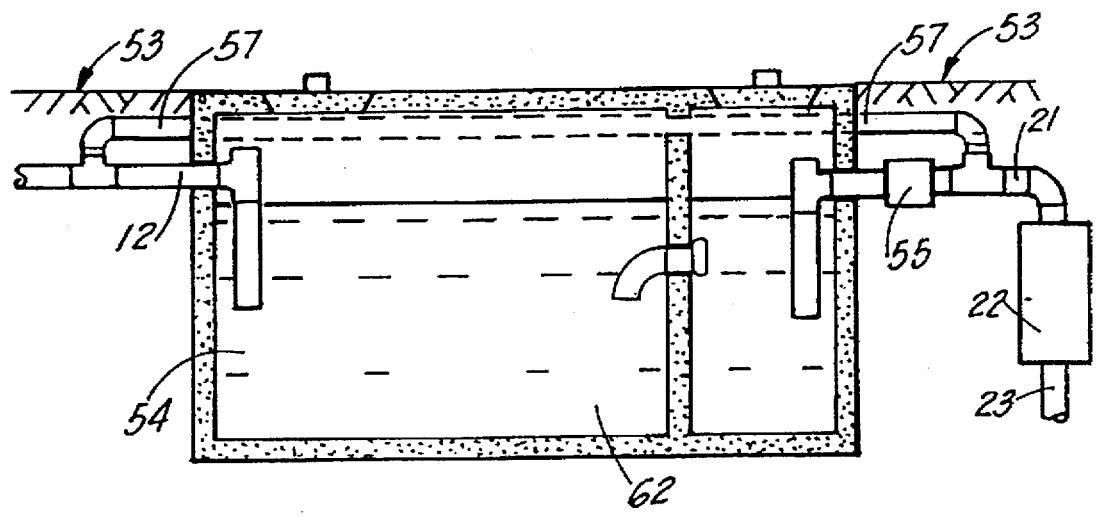

In FIG. 5 influent flowline 12 carries wastewater to be treated into alternate non-aerating treatment vessel 54. Effluent line 21 carries treated wastewater to filter 22 for treatment as previously described. Third check valve 55 located within the effluent line 21 prevents backwashing fluid from entering the discharge line of the alternate non-aerating treatment vessel 54. The backwashing fluid from filter 22 travels via alternate bypass line 57 into the upstream portion influent line 12 through which the filtered backwash is reintroduced to alternate non-aerating vessel 54 to be retreated. FIG. 6 shows the preferred embodiment illustrated in FIG. 4 except that, as in FIG. 5, an alternate non-aerating treatment vessel 54 is illustrated in place of aerating treatment vessel 11 and alternate bypass line 57 is shown in place of bypass line 38. All other features of the preferred embodiment as illustrated in FIG. 4, including the optional adjustable flow arrangement 56 are the same as those described for FIG. 4. The alternate bypass line 57 and the alternate non-aerating treatment vessel 54 illustrated in FIG. 6 are as described previously for FIG. 5.

FIGS. 7A–E show a plurality of alternate configurations of non-aerating treatment vessels 58–62. FIGS. 7A–E relate to FIGS. 5 and 6, where alternate non-aerating treatment vessel 54 is replaced with, alternate configurations of non-aerating treatment vessels 58–62.

Figure 8A:
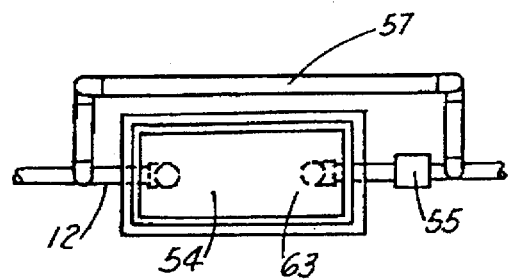
FIGS. 8A–8C are schematic and fragmentary top views of alternate configurations of the alternate non-aerating treatment vessels.
Figure 8B:
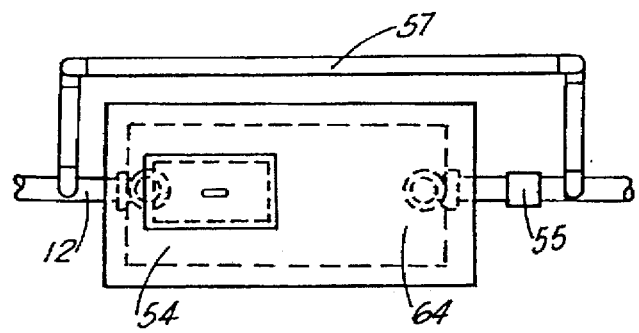
Figure 8C:
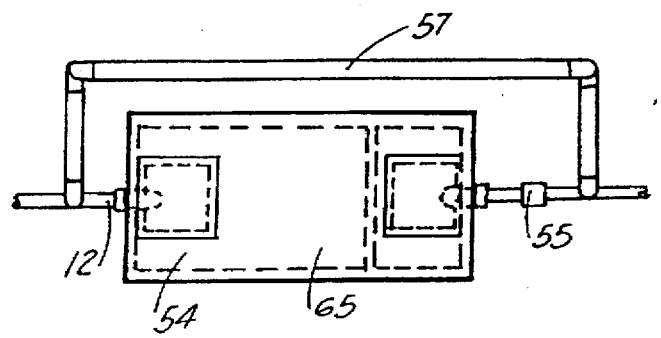
Figure 9A:
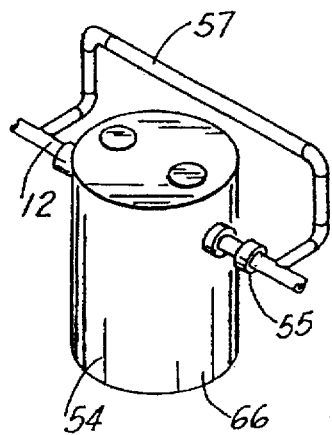
FIGS. 9A–9E are elevation, and fragmentary views of alternate non-aerating treatment vessels.
Figure 9B:
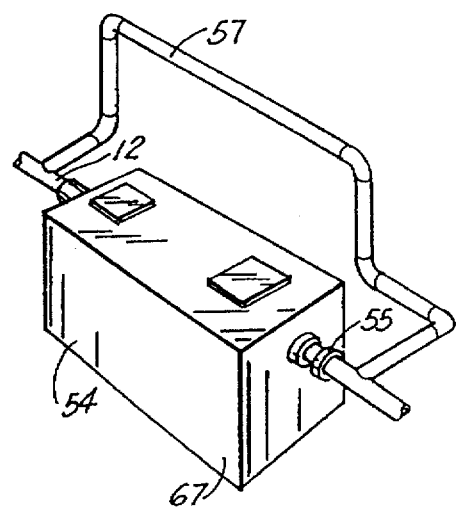
Figure 9C:
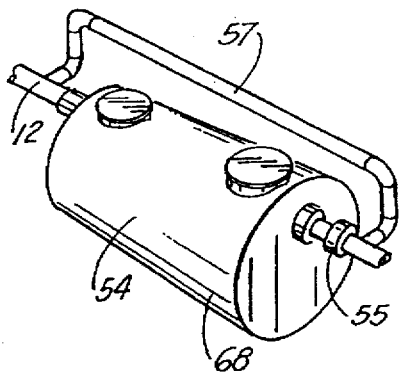
Figure 9D:
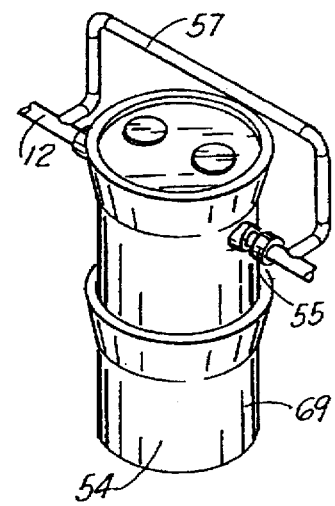
Figure 9E:
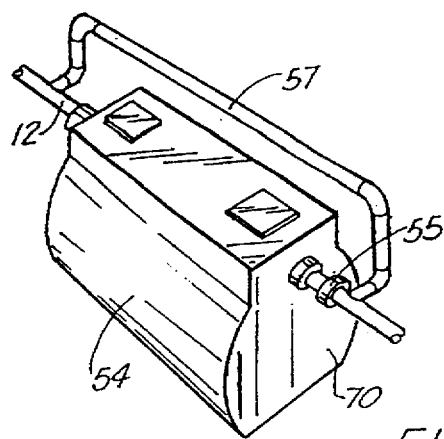

FIGS. 8A–C show a top view if a plurality of alternate configurations of non-aerating treatment vessels 63–65. FIGS. 8A–C relate to FIGS. 5 and 6 where alternate non-aerating treatment vessel 54 is replaced with an alternate configuration of non-aerating treatment vessels 63–65.

FIGS. 9A–E illustrate a fragmentary views of the preferred embodiment with alternate configurations of non-aerating treatment vessels 66–70. FIGS. 9A–E relate to FIGS. 5 and 6, where the alternate nonaerating treatment vessel 54 is replaced with a alternative configurations of non-aerating treatment vessels 66–70.

Figure 10:
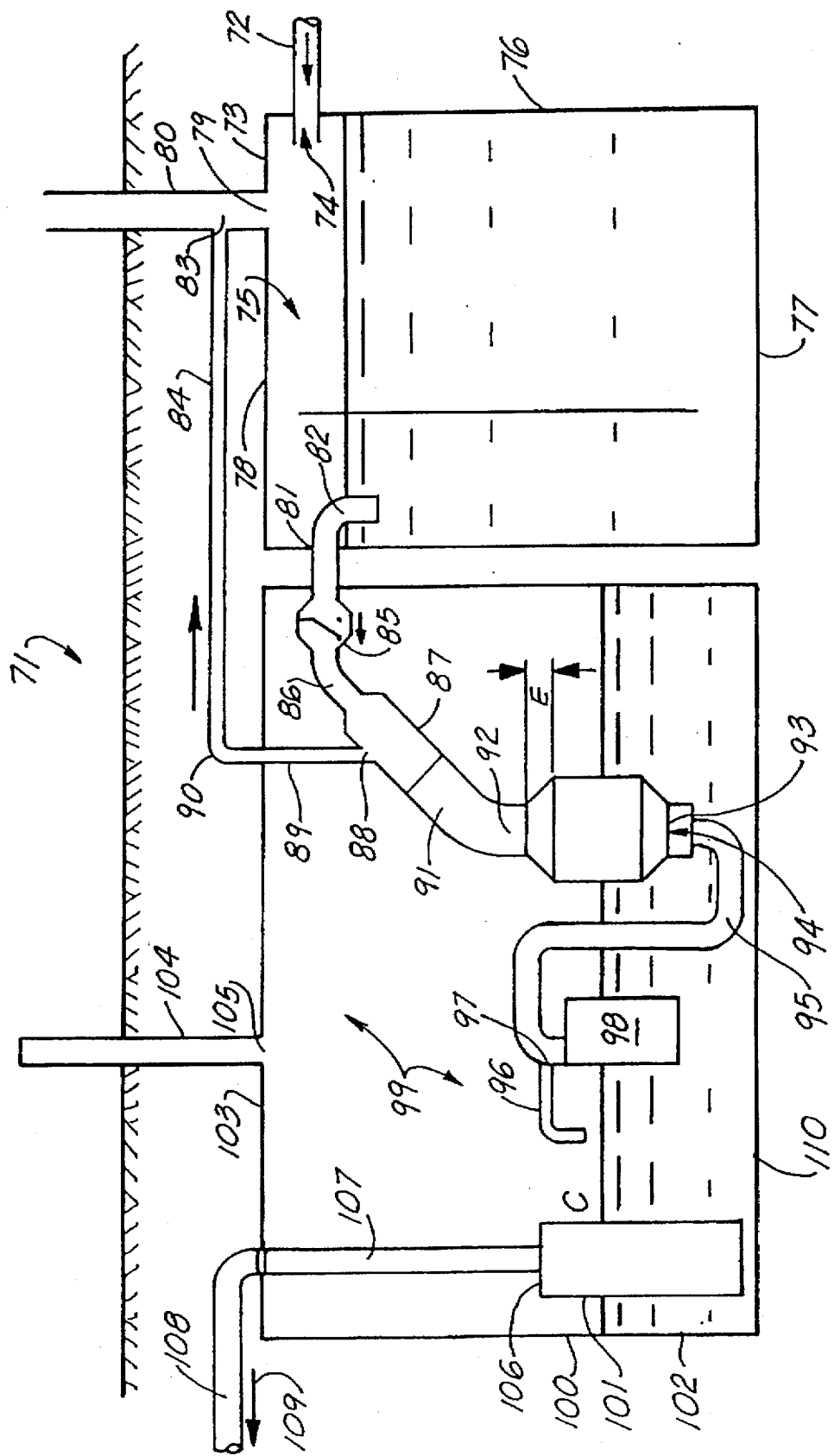
FIG. 10 is a schematic; elevational view of a second embodiment of the apparatus of the present invention.

FIG. 10 illustrates a second embodiment of the apparatus of the present invention designated generally by the numeral 71. Waste treatment system 71 includes an influent line 72 that enters aerated primary treatment tank 73 at inlet opening 74. An air pump and diffuser (not shown) are contained within tank 73 interior 75. Tank 73 has a number of continuous walls for containing fluid within a vessel interior 75. The vessel interior 75 receives influent flow from flow line 72 and inlet 74. The vessel sidewall 76 is connected integrally to bottom 77 and top 78.

Outlet 79 communicates with vent stack 80. Outlet 81 defines an outlet for flow line 82 that communicates with valve 85 and gravity separation filter 87. A backwash line includes horizontal section 84 and vertical section 89. The sections 84, 89 are connected by ell fitting 90. The horizontal section 84 communicates with vent stack 80 at opening 83. The vertical section 89 communicates with gravity separation filter 87 at opening 88. Swing check valve 85 allows fluid flow from primary treatment tank 73 into dosing tank 100, but closes to disallow back flow from dosing tank 100 to treatment tank 73 when the apparatus 71 is backwashing, for example.

Check valve 85 communicates with a diagonal pipe section 86 at the upper end portion of gravity separation filter 87. The gravity separation filter 87 includes an inclined section 91 that assumes an angle of about 45° with horizontal. The lower end portion 92 of gravity separation filter 87 is vertically oriented to communicate with sand filter 93. Sand filter 93 includes a lower perforated plate 94 that retains sand above plate 94, but which allows water to pass therethrough. Outlet line 95 communicates between gravity separation filter 87 and backwash pump 98.

Flow line 96 communicates with interior 99 of dosing tank 100 at opening 97 of flowline 95. The line 96 is an orifice line that allows a measured amount of fluid flow at a given pressure to flow from line 95 into the interior 99 of dosing tank 100. Dosing tank 101 has an interior 99 defined by bottom wall 110, top wall 103 and side walls 102. As the fluid level rises within the interior 99 of dosing tank 100, a dosing pump 101 is activated to discharge the fluid contained within interior 99 via flow line 107 to a drip field as indicated by the arrow 109 in FIG. 10. Flow line 107 is a vertically extending flow line that communicates with a horizontal section 108 to transmit the discharged fluid to the drip field. A vent stack 104 extends from top wall 103 of tank 100, the vent stack 104 communicating with tank 100 at opening 105.

In operation, effluent from the treatment tank 73 flows out through a line 82 located at the top of the discharge end of the treatment tank. This discharge is directed through a swing check valve 85 and then turns down at a 45° angle diagonal section 86. The forward flow continues down at 45° through the gravity separation filter 87. The length of this filter 87 is determined by the desired backwashing flow rates and sand filter particle size for filter 93.

At the lower end of the gravity separating filter section 87 is a 45° ell fitting which turns down vertically into the top of the graded sand filter. At the lower end of the sand filter 93 is a sand support screen or plate made of 20 mesh perforated (0.033" diameter holes).

A graded sand bed is placed on top of the plate or screen. This bed can consist of 3½" of ⅜" gravel, 1½" of 4×6 sand, 3" of 6×10 sand, 3" of 8×16 sand. The location of this filter is at the lowest possible elevation of the dosing tank 100, allowing for the maximum forward hydraulic head. During periods of low flow and clean filter, no level builds up at the top of the sand bed. As the filter 93 becomes dirty, the pressure drop through the filter 93 rises, raising the level of liquid at the diagonal portion 87. However the higher the level the higher the forward pressure and the greater the flow. This filter 93 is self compensating over most of its cycle and flow remains relatively high.

A short section of pipe connects the filter assembly to the backwash and support manifold, designated as 95.

The level of liquid in the sand filter at 93 is maintained 4" above the top of the sand for more uniform distribution of the inlet flow and to help prevent channeling of the sand bed during forward flow. This also keeps the sand filter 93 from drying out during long periods of disuse.

From the top of the gravity separation section 87 the backwash line 84, 89 is routed back to the vent 80 of the treatment tank 73. At the discharge end of this line 84, 89 is a block valve and a drain valve. This drain can be used to collect and time measure the backwash flow for initial setup and trouble shooting.

During forward flow, the effluent flows by gravity past the swing check 85 and down into the filter section 87, 93. This filter arrangement 87, 93 is not an absolute filter and is not designed to trap all the solids, but rather to trap particles that could plug drip emitters. The holes in the lower plate or screen 94 are smaller than the holes in the drip system, providing a secondary protection against sand or other particles.

The pump manifold inline 95 forms a seal leg which always keeps a liquid level above the top of the sand bed 94. However, under normal conditions the forward flow pressure will always be about 2½ feet of head or approximately 1 psi. At the top of the seal leg 95 is the orifice line 96. Normal flow exits the filter line through this orifice line 96. However, during times of peak flow the orifice will flood, raising the level in the inlet of the filter 93 to prevent disturbing the top of the sand layer. The extra flow will then flow backward, effectively increasing the flow rate through the filter. The orifice line 96 acts as a vacuum breaker preventing pump flow acting like a siphon and draining the filter 93.

Beginning when there is adequate level in the tank 100 determined by the low cutoff float switch, the system enters the automatic dosing and backwash cycle. At precisely timed intervals determined by the expected maximum flow and the length of the drip field, the cycle begins by turning on the backwash pump 98. These cycle times are set at the time of installation and should not normally be accessible to the homeowner. The orifice line 96 allows part of the flow to be diverted at high velocity to the dosing tank 100 to stir up the contents. The remaining water is diverted up through the sand filter 93 to wash out the solids that have collected. The backwash pump, orifice, pipe sizes and filter bed are sized to work together with balanced flows.

This rapid backwash floods quickly into the gravity separation section 87. Any entrained sand particles will begin to fall out of the upward flowing water, allowing easy separation of the filtered particles from any sand that might be carried out of the main filter area. Having a much lower specific gravity, filtered particles are carried on up and out the discharge back to the treatment tank via line 84, 89. An air lock is formed below the check valve 85 which assures that all trapped material is flushed out of the system. Sand deposited on the lower wall of the pipe will remain there until backwash is completed. During drain back these particles are carried back down the inlet and redeposited in the bed.

The complete backwash cycle is using a timer set. This timer can be readjusted in the field (e.g., from 30 to 300 seconds). Average backwash times of 1 minute or less should be typical. At the end of the backwash cycle the dosing pump 106 is cycled on. This pump is held on for a precise time period based on the size of the drip field and the cycle on-off times. Timed dosing allows for the normal flow from a household, which usually occurs in the evenings, to be stored and distributed throughout the day for more thorough absorption and less chance that discharge will find its way to the surface.

The system 71 can include a distribution line flushing operation. The initial time dosing for the system 71 each day will activate a one shot time which will control two functions. The first will be to backwash the filter 93, the backwash flow returning to the primary treatment tank 73. The second function will be to activate a solenoid which will open a tank, thus flushing the distribution system. The length of time that this return flow valve will be open will depend upon the length and configuration of the drip disposal lines.

The following table lists the part numbers and part descriptions as used herein and in the drawings attached hereto.

PARTS LIST

| Part Number | Description |
|---|---|
| 10 | waste treatment system |
| 11 | aerating treatment vessel |
| 11A | vessel interior (larger) |
| 11B | vessel interior (smaller) |
| 11C | aerator |
| 12 | influent flowline |
| 13 | bottom wall |
| 14 | top wall |
| 15 | front wall |
| 16 | rear wall |
| 17 | baffle |
| 18 | inclined wall |
| 19 | effluent header |
| 20 | first check valve |
| 21 | effluent line |
| 22 | filter |
| 22A | filter inlet |
| 22B | filter outlet |
| 23 | filtered effluent line |
| 24 | flow control device |
| 25 | tee fitting |
| 26 | dosing chamber |
| 27 | pump |
| 27A | float switch |
| 28 | pump discharge line |
| 29 | elbow fitting |
| 30 | outlet |
| 31 | header |
| 32 | drip line |
| 33 | drip line |
| 34 | drip line |
| 35 | drip line |
| 36 | flow arrow - filtration |
| 37 | flow arrows - backwashing |
| 38 | bypass line |
| 39 | tee fitting |
| 40 | discharge opening |
| 41 | arrows |
| 42 | elbow |
| 43 | media support plate |
| 44 | filter media |
| 45 | adjustable control valve |
| 46 | tee fitting |
| 47 | tee fitting |
| 48 | second check valve |
| 49 | riser |
| 50 | riser |
| 51 | horizontal section |
| 52 | tee fitting |
| 53 | ground level |
| 54 | alternate non-aerating treatment vessel |
| 55 | third check valve |
| 56 | adjustable flow control arrangement |
| 57 | alternate bypass line |
| 58-70 | alternate configurations of non-aerating treatment vessel |
| 71 | waste treatment system |
| 72 | influent line |
| 73 | primary treatmment tank |
| 74 | inlet opening |
| 75 | interior |
| 76 | sidewall |
| 77 | bottom |
| 78 | top |
| 79 | outlet |
| 80 | vent stack |
| 81 | outlet |
| 82 | flow line |
| 83 | opening |
| 84 | horizontal section |
| 85 | check valve |
| 86 | diagonal section |
| 87 | filter |
| 88 | opening |

PARTS LIST -continued

| Part Number | Description |
|---|---|
| 89 | vertical section |
| 90 | ell fitting |
| 91 | inclined section |
| 92 | lower end section |
| 93 | sand filter |
| 94 | perforated plate |
| 95 | outlet line |
| 96 | flow line |
| 97 | opening |
| 98 | backwash pump |
| 99 | interior |
| 100 | dosing tank |
| 101 | dosing pump |
| 102 | side wall |
| 103 | top wall |
| 104 | vent stack |
| 105 | opening |
| 106 | dosing pump |
| 107 | flow line |
| 108 | horizontal section |
| 109 | arrow |
| 110 | bottom wall |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A wastewater treatment system comprising:

a) a treatment vessel having an interior area for containing a wastewater product to be treated;

b) an influent line for adding wastewater to be treated into the interior of said treatment vessel;

c) an effluent line for discharging treated wastewater from said treatment vessel;

d) a filter for filtering treated wastewater effluent from said treatment vessel, said filter being connected to said effluent line in order to receive treated wastewater via said effluent line;

e) a filter discharge line for transmitting filtered discharge;

f) a collection vessel, said collection vessel arranged for collecting said filtered discharge;

g) a pump arranged for emptying liquid from said collection vessel as discharge when it is filled with the filtered discharge;

h) a means for controlling filtered backwash located within the filter discharge line enabling a partial volume of liquid to flow in reverse direction through the filter discharge line to backwash the filter upon pump activation; and i) a final discharge line to receive pumped liquid from the collection vessel that is not diverted to backwash the filter.

2. The apparatus of claim further comprising:

a) a flow control line connected to said filter discharge line both upstream and downstream of said means for controlling filtered backwash;

b) said flow control line arranged to direct pump discharge around said means for controlling filtered backwash when said pump is activated; and c) a flow control valve located within said flow control line arranged for regulating amount of pump discharge flowing to backwash said filter upon pump activation.

3. The apparatus of claim 1 further comprising:
   a) a drip header system arranged for receiving treated, filtered liquid from said final discharge line upon pump activation; and
   b) said drip header system comprising a network of flow lines for distributing treated, filtered liquid over a selected expansive area.

4. The apparatus of claim 1 wherein said treatment vessel is divided into upstream and downstream portions.

5. The apparatus of claim 1 wherein the pump is a well pump contained within the collection vessel interior.

6. The apparatus of claim 1 wherein there is further provided a level control means for activating the pump when the collection vessel is full of filtered liquid.

7. The apparatus of claim 1 wherein the treatment vessel is a sealed vessel having a top wall that closes the top of the vessel so that the vessel can be installed underground.

8. The apparatus of claim 1 wherein the means for controlling filtered backwash comprises in part a flow control orifice.

9. The apparatus of claim 1 wherein the means for controlling filtered backwash is constructed to enable a pre-selected volume of liquid discharged by the pump from the collection vessel to automatically backwash the filter each time the pump is activated to empty the collection vessel.

* * * * *